(12) United States Patent
Giametta (10) Patent No.: US 9,726,333 B2
(45) Date of Patent: Aug. 8, 2017

(54) SINGLE COLOR OR MULTIPLE COLOR LED ANGEL EYES HALO HEADLIGHT

(71) Applicant: Curtis Anthony Giametta, Ocean Springs, MS (US)

(72) Inventor: Curtis Anthony Giametta, Ocean Springs, MS (US)

( * ) Notice: Subject to any disclaimer, the term of this patent is extended or adjusted under 35 U.S.C. 154(b) by 110 days.

(21) Appl. No.: 13/621,805

(22) Filed: Sep. 17, 2012

(65) Prior Publication Data
US 2014/0078766 A1 Mar. 20, 2014
US 2016/0363270 A9 Dec. 15, 2016

Related U.S. Application Data

(60) Provisional application No. 61/539,304, filed on Sep. 26, 2011.

(51) Int. Cl.
*B60Q 1/04* (2006.01)
*F21K 9/278* (2016.01)
*B60Q 1/00* (2006.01)

(52) U.S. Cl.
CPC ............ *F21K 9/278* (2016.08); *B60Q 1/0052* (2013.01); *B60Q 2400/30* (2013.01); *B60Q 2900/30* (2013.01)

(58) Field of Classification Search
CPC ... B60Q 1/04; B60Q 1/06; B60Q 1/02; B60Q 2900/30; B60Q 1/14; B60Q 1/26; B60Q 1/2696; B60Q 2400/30
USPC ..... 362/487, 507, 538, 227, 249.02, 249.06, 362/514
See application file for complete search history.

(56) References Cited

U.S. PATENT DOCUMENTS

| | | | | |
|---|---|---|---|---|
| 1,675,731 A * | 7/1928 | Schofield | ................ | F21V 11/00 362/291 |
| 2,556,328 A * | 6/1951 | Hinds | ................. | F21S 48/1225 362/309 |
| 3,759,084 A * | 9/1973 | Plewka | ................. | B60J 3/0291 362/235 |
| 3,818,210 A * | 6/1974 | Pitkjaan | ................. | F21S 48/10 315/82 |
| 4,922,398 A * | 5/1990 | Muto | .................... | F21S 48/145 313/114 |
| 5,893,626 A * | 4/1999 | Poling | ........................ | B62J 6/04 362/231 |

(Continued)

OTHER PUBLICATIONS

Super Bright LEDs https://www.superbrightleds.com/moreinfo/628/#/tab/Overview.*

(Continued)

*Primary Examiner* — Elmito Breval
*Assistant Examiner* — Naomi M Wolford
(74) *Attorney, Agent, or Firm* — Ash Tankha; Lipton, Weinberger & Husick (57) ABSTRACT

A lamp that has a housing with a base containing a main lighting device lamp with an internal circumferential wall arrange with a visible ring of Printed Circuit Board (PCB) with Surface Mounted Device (SMD) Light Emitting Diode (LED) characteristic of a halo of more than one visible Single color or Multiple color LED arranged symmetrically with light illumination facing forward and outward from the headlight and controlled by a user with a wireless signal transmitting device sending signals to a wireless receiving device to control the LED color shade, intensity and pattern.

8 Claims, 7 Drawing Sheets

(56) References Cited

U.S. PATENT DOCUMENTS

| | | | | |
|---|---|---|---|---|
| 5,984,494 | A * | 11/1999 | Chapman | B64D 47/04 |
| | | | | 362/240 |
| 6,471,368 | B1 * | 10/2002 | Lin | B60Q 1/0052 |
| | | | | 362/216 |
| 6,984,062 | B2 * | 1/2006 | Yeh | 362/544 |
| 7,011,438 | B2 * | 3/2006 | Schuster | B60Q 1/0052 |
| | | | | 362/494 |
| 7,055,999 | B2 * | 6/2006 | Lin | B60Q 1/0052 |
| | | | | 362/511 |
| 7,144,144 | B2 * | 12/2006 | Hsu | 362/543 |
| 7,153,010 | B2 * | 12/2006 | Yamada | B29C 66/73921 |
| | | | | 362/310 |
| 7,186,003 | B2 * | 3/2007 | Dowling | F21S 8/035 |
| | | | | 315/295 |
| 7,261,451 | B2 * | 8/2007 | Coushaine et al. | 362/544 |
| 7,261,452 | B2 | 8/2007 | Coushaine | |
| 7,854,538 | B2 * | 12/2010 | Helms | 362/545 |
| 8,066,391 | B2 * | 11/2011 | Zhong | 362/20 |
| 8,398,280 | B2 * | 3/2013 | Miyagawa | 362/476 |
| 2003/0031022 | A1 * | 2/2003 | Yamaguchi | B60Q 1/007 |
| | | | | 362/487 |
| 2006/0291234 | A1 * | 12/2006 | Chiang | B60Q 1/0011 |
| | | | | 362/545 |
| 2008/0136660 | A1 * | 6/2008 | Bailey | 340/815.45 |
| 2009/0180291 | A1 * | 7/2009 | Tam | B60Q 1/2696 |
| | | | | 362/487 |
| 2009/0251908 | A1 * | 10/2009 | Czuhanich et al. | 362/485 |
| 2010/0186214 | A1 * | 7/2010 | Judge | 29/445 |
| 2011/0035029 | A1 * | 2/2011 | Yianni et al. | 700/90 |

OTHER PUBLICATIONS https://www.youtube.com/watch?v=20WicAFapnU.*
Google Search—LED Angel eye headlight.*

* cited by examiner

SINGLE COLOR OR MULTIPLE COLOR LED ANGEL EYES HALO HEADLIGHT

CROSS-REFERENCE TO RELATED APPLICATIONS

This application claims the benefit of Provisional Patent Application No. 61/539,304, filed Sep. 26, 2011 in the United States Patent and Trademark Office.

FIELD OF INVENTION

This disclosure relates to a motor-vehicle headlight and more particularly to such headlights or spotlight employing more than one lighting sources; one using a main lighting device lamp in the center and another with more than one Light Emitting Diodes (hereafter, LED). Still more as it relates to a headlight or a spotlight using multiple LED.

BACKGROUND

Present day headlights offer many features to include asthetic design, safety and brighter illumination. The round and square headlight technology of vintage vehicles has not advanced to include these present day technologies. Vintage vehicle show car owners desire a more modem technology and retro headlight design to fit their vehicles. The object of this invention is to overcome drawbacks of Original Equipment Manufactured (hereafter, OEM) headlights by providing a brighter and more focused beam that also provides better side light and further distant illumination. In addition to an improved main lighting device lamp, another accentuating feature that provides added illumination and safety is the addition of Daylight Running Lights (hereafter, DRL). The DRL feature employed is an aesthetically pleasing design in the form of a ring characteristic of a halo provided by introducing a Printed Circuit Board (hereafter, PCB) containing Surface Mounted Device (hereafter, SMD) LED symmetrically spaced on a ring with the LED light illumination facing forward and outward from the headlight. This DRL is dual featured; first featured as additional lighting for driving when selected and the second feature as accent lighting when participating at a car show with the user ability to remotely choose an LED color shade that matches or contrasts the color of their vehicle.

SUMMARY OF THE INVENTION

An object of the Invention is to overcome some of the drawbacks relating to the compromise designs of prior art devices as described above. The embodiments reside in the Single color or multiple color LED angel eyes halo headlight. A circular round motor-vehicle or non-motor-vehicle headlight enclosure 2 with a parabolic or non-parabolic reflective base 32 and a circular opening 30 opposite the reflective base 32. The circular round headlight enclosure 2 further comprises a clear crystal glass lens 4 containing a main lighting device lamp 18 and containing a ring characteristic of a halo with more than one LED 8 with light illumination facing forward and outward from the headlight through the clear glass lens.

A headlight enclosure with an area around the main lighting device lamp at the reflective base 32 and on the internal circumferential wall contains a PCB 8 containing more than one single color or multiple color SMD LED symmetrically spaced and visibly facing forward and outward. PCB 8 is located on the inside of the headlight immediately behind the clear crystal glass lens 4. Extended from the PCB 8 are wires that extend from the base of the PCB 8 inside of the headlight to exit outside of the headlight with a rubber grommet (not shown) to a connector 10.

A headlight enclosure allows for the interchangeability of a selection of lamps as the main lighting device lamp 18. The main lighting device lamp 18 is an independent lighting source then that of the PCB 8 SMD LED ring. The main lighting device lamp 18 uses the vehicle OEM wiring and switching systems to supply power.

The backside of the headlight includes a lamp receiving area in the form of a cylindrical base 34 containing the headlight retention assembly where the lamp shade 6 is attached to the headlight and to also contain a lamp retaining spring 12 and lamp retaining spring clip 14 to tightly retain the main lighting device lamp 18 and the pliable rubber like boot 16 to cover and encapsulate headlight enclosure 2 and weather proof the headlight lamp receiving area.

Provides 50% more lighting over OEM headlights.

Additional lighting is provided by the PCB 8 SMD LED with light illumination facing forward and outward from the headlight providing a switchable addition lighting system. This lighting system can be setup to provide additional lighting for safety. When this lighting is used as a Daylight Running Light (hereafter, DRL), which is employed on many new ears of this day, the DRL can provide noticeable lighting to other drivers and aid in the prevention of vehicular accidents.

Includes a wireless transmitting device 22 to send signals remotely to a wireless receiving device and signal processing circuitry that then pass the signals via wire harness 28 to headlight enclosure 2 to PCS 8 SMD LED on a ring characteristic of a halo for color selection, color intensity, turn on all LED, turn off all LED, and selectable modes of color patterns remotely based on a users choice. The wireless transmitting device 22 can be but not limited to a smart phone device with a user interface application, Bluetooth transmitting device, Internet Packet (IP) addressable device, Infrared transmitting device and Radio Frequency (RF) transmitting device. The wireless transmitting device is powered by a battery source.

Includes a wireless receiving device 20 to receive and process remotely received signals with a signal processing circuitry to the SMD LED on the PCB 8 ring characteristic of a halo for color selection, color intensity, turn on all LED, turn off all LED, and selectable modes of color patterns based on a users choice. The wireless receiving device 20 can be but not limited to a Bluetooth receiving device, Internet Packet (IP) addressable receiving device, Infrared receiving device and Radio Frequency (RF) receiving device. The wireless receiving device and signal processing circuitry 20 is powered via wire to the vehicle battery source.

Includes a wiring harness 28 from the wireless receiving device and signal processing circuitry 20 to contain one or more connectors 10 connected directly to headlight enclosure 2.

SMD LED emits a solid color of any color shade or of a multiple color of any color shade changeable from signals carried from a wiring harness 28 and then from the signals from the wireless receiving device and signal processing circuitry 20.

Allows a user the ability to choose to bypass by way of harness wire 10 the wireless transmitting device 22 and wireless receiving devices signal processing circuitry 20 to directly connect to OEM wiring for the single color LED headlight if the user wants the headlight color and intensity settings to be set to default settings.

Includes the latest in present day SMD LED made in many types shapes, emitting radius, viewing angles and levels of brightness and illumination.

DRAWINGS

Reference Numerals

| | |
|---|---|
| 2 - Headlight Enclosure | 4 - Glass Lens |
| 6 - Lamp Shield | 8 - Printed Circuit Board (PCB) in the form of a ring characteristic of a halo containing more than one Surface Mounted Device (SMD) single color or multiple color Light Emitting Diode(s) |
| 10 - LED signal harness with connector | 12 - Lamp retainer spring |
| 14 - Lamp retain spring clip | 16 - Rubber pliable boot |
| 18 - Main Lighting Device Lamp | 20 - Wireless receiving device and signal processing circuitry |
| 22 - Wireless transmitting device | 24 - Harness wire for positive and negative power |
| 26 - Signal receiver wire | 28 - Wire harness to receiving device and signal processing circuitry |
| 30 - Circular opening | 32 - Reflective base |
| 34 - Cylindrical base. | |

DETAILED DESCRIPTION OF THE INVENTION

Figure 1:
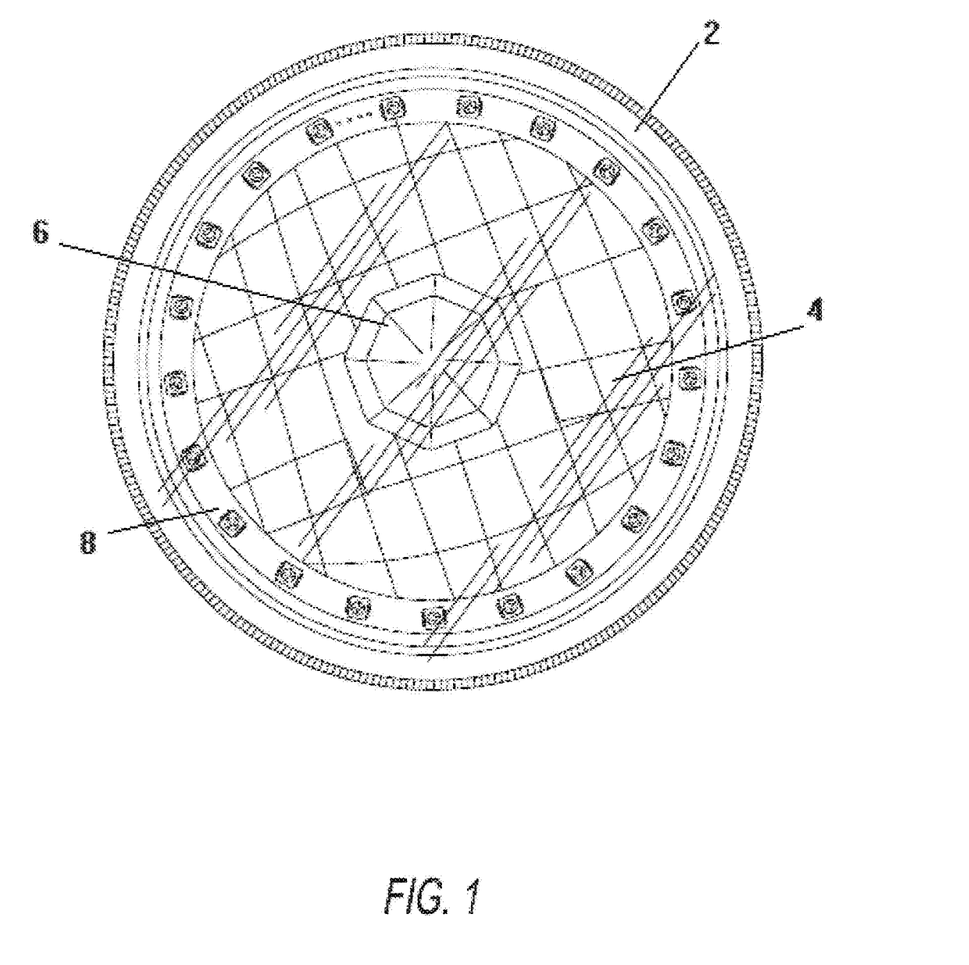
FIG. 1 shows the front view of the Single color or multiple color LED angel eyes halo headlight.

Referring now to the drawings with greater particularity, there is shown in FIG. 1, a symmetrical frontal view of the headlight as if it was mounted in a vehicle. In this view, the two lighting systems are pointed forward from the vehicle. Headlight enclosure 2 has attached in the center, a lamp shield 6 to cover the direct lighting from the main lighting device lamp 18 (not shown in drawing) and to disburse the lighting backward to mirror like parabolic reflective base 32 of headlight enclosure 2 outward of the headlight through clear glass lens 4. The PCB in the form of a ring characteristic of a halo containing more than one SMD single color or multiple color LED with light illumination facing forward and outward to provide a secondary lighting system.

Figure 2:
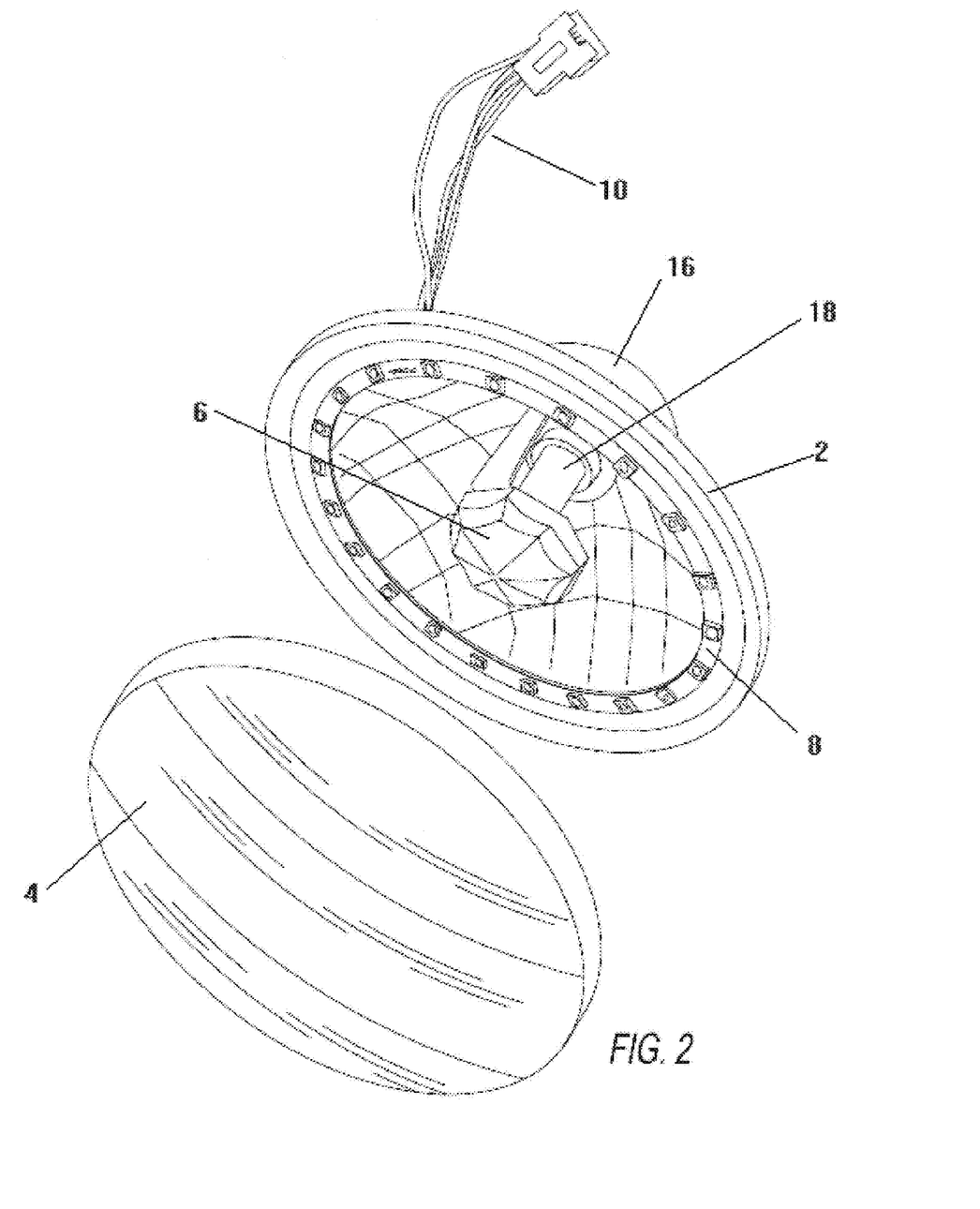
FIG. 2 shows a side view of the Single color or multiple color LED angel eyes halo headlight will; the glass lens unattached.

FIG. 2 shows a symmetrical side view of headlight enclosure 2. The lamp shield 6 shown in the center with the main lighting device lamp 18 is shown under the lamp shield 6. PCB 8, showing more than one SMD LED is attached to headlight enclosure 2 at the outer circumferential wall just below the glass lens 4. Glass Lens 4 once installed encapsulates all the inner components listed to provide a weatherproof seal to the front of headlight enclosure 2. Rubber pliable boot 16 is applied over the rear cylindrical base 34 of headlight enclosure 2 to provide a weatherproof seal to the rear of headlight enclosure 2. Wire harness 10 is the wire harness that is connected to the PCB 8 on the inside of the headlight and passes through a grommet (not shown) to the outside of the headlight. Wire harness 10 has a quick disconnect connector attached on the end. The lamp shield 6 covers the lighting device lamp 18 to block light from the lighting device lamp from being transmitted directly forward and out of the headlight enclosure 2. The lamp shield 6 reflects light from the lighting device lamp 18 backward to the parabolic reflective base 32, and the parabolic reflective base 32 reflects the light from the lamp shield 6 and incident on the parabolic reflective base 32, forward and directly out of the headlight enclosure 2 through a single clear glass lens 4.

Figure 3:
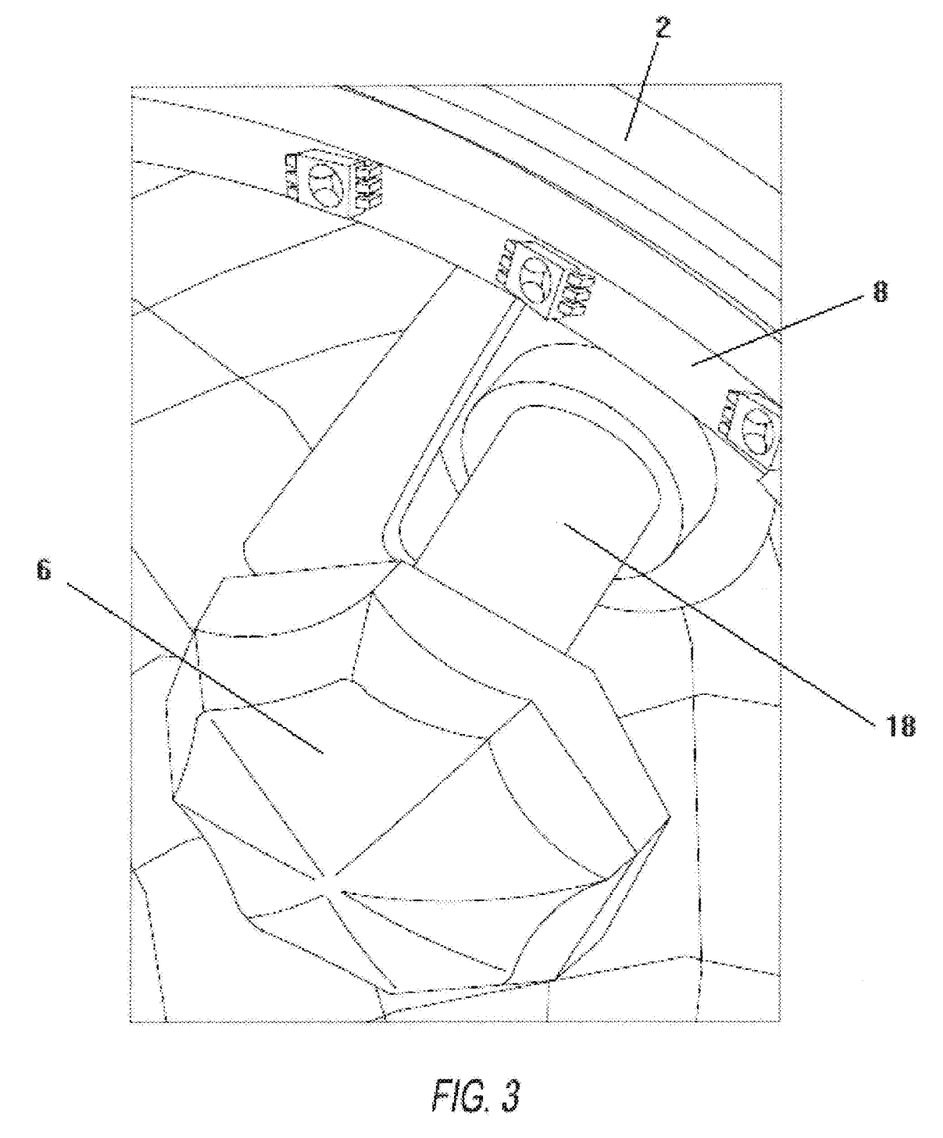
FIG. 3 shows an up close view of the lamp under the lamp shield and a close up view of the PCB containing more than one SMD single color or multiple color LED symmetrically spaced and visibly facing forward and outward from the headlight.

FIG. 3. shows a cutaway close up view of FIG. 2. Headlight enclosure 2 with the lamp shield 6 shown in the center with the main lighting device lamp 18 shown under the lamp shield 6. PCB 8 showing more than one SMD LED is attached to headlight enclosure 2 at the outer circumferential wall just below the glass lens 4.

Figure 4:
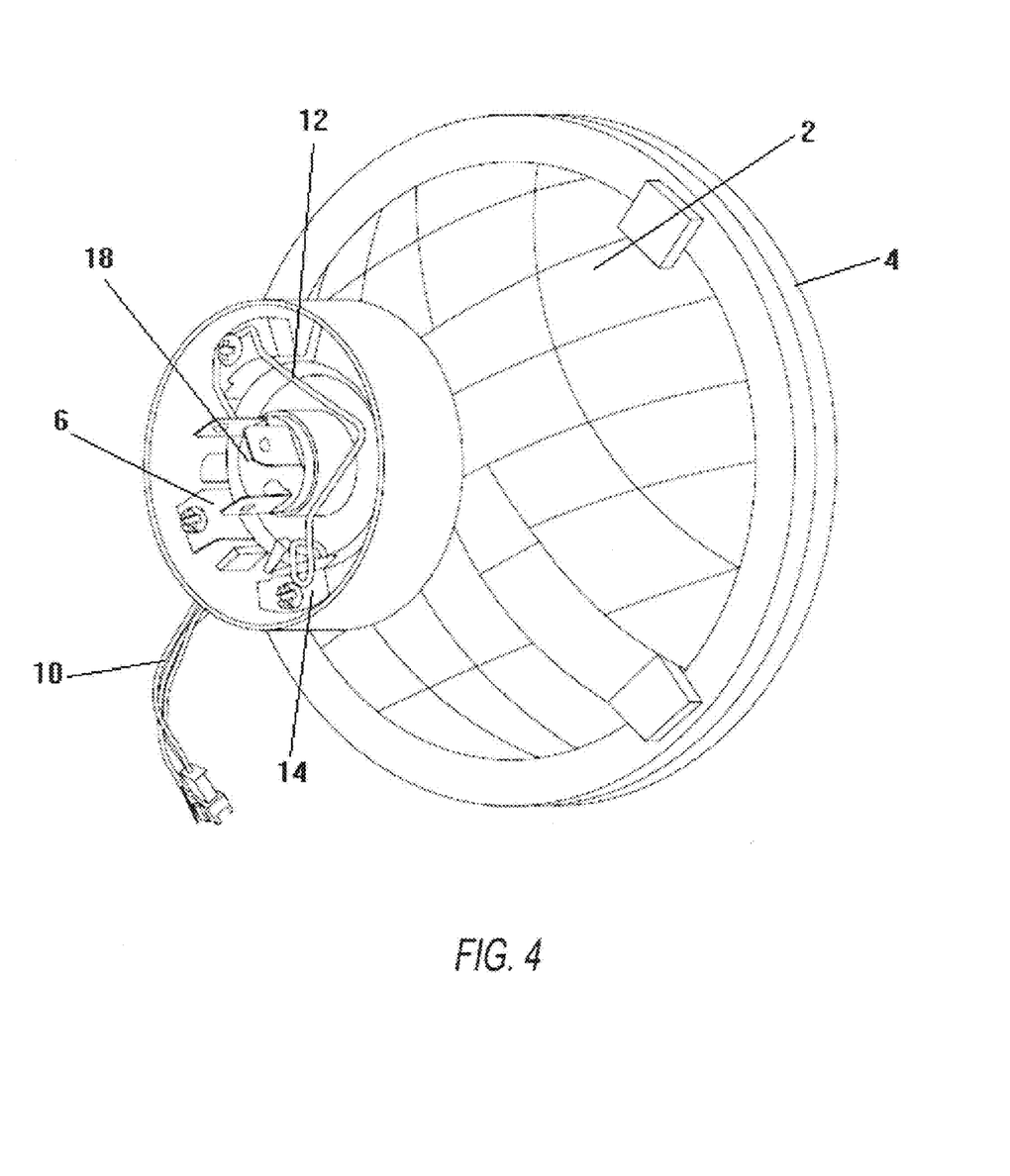
FIG. 4 shows the rear view of the headlight exposing the lamp receiving assembly area.

FIG. 4. shows a symmetrical rear view of headlight enclosure 2. The rear of headlight enclosure 2 contains a cylindrical base 34 containing the headlight retention assembly and the place to secure the center lamp shield 6 and main lighting device lamp 18. Lamp Shield 6 is secured to headlight enclosure 2 by a Phillips screw (not shown). The headlight retention assembly contains the lamp retainer spring 12 and the lamp retainer spring clip 14. The main lighting device lamp 18 is secured by pressing on the end of the lamp retainer spring 12 and clipping the end of the lamp retainer spring 12 under lamp retainer spring clip 14 thus retaining the main lighting device 18. The lamp retainer spring and lamp retainer spring clip 14 is secured to headlight enclosure 2 by a Philips screw. Wire harness 10 is the wire harness that is connected to the PCB 8 on the inside of the headlight and passes through a grommet (not shown) to the outside of the headlight enclosure 2. Wire harness 10 has a quick disconnect connector attached on the end.

Figure 5:
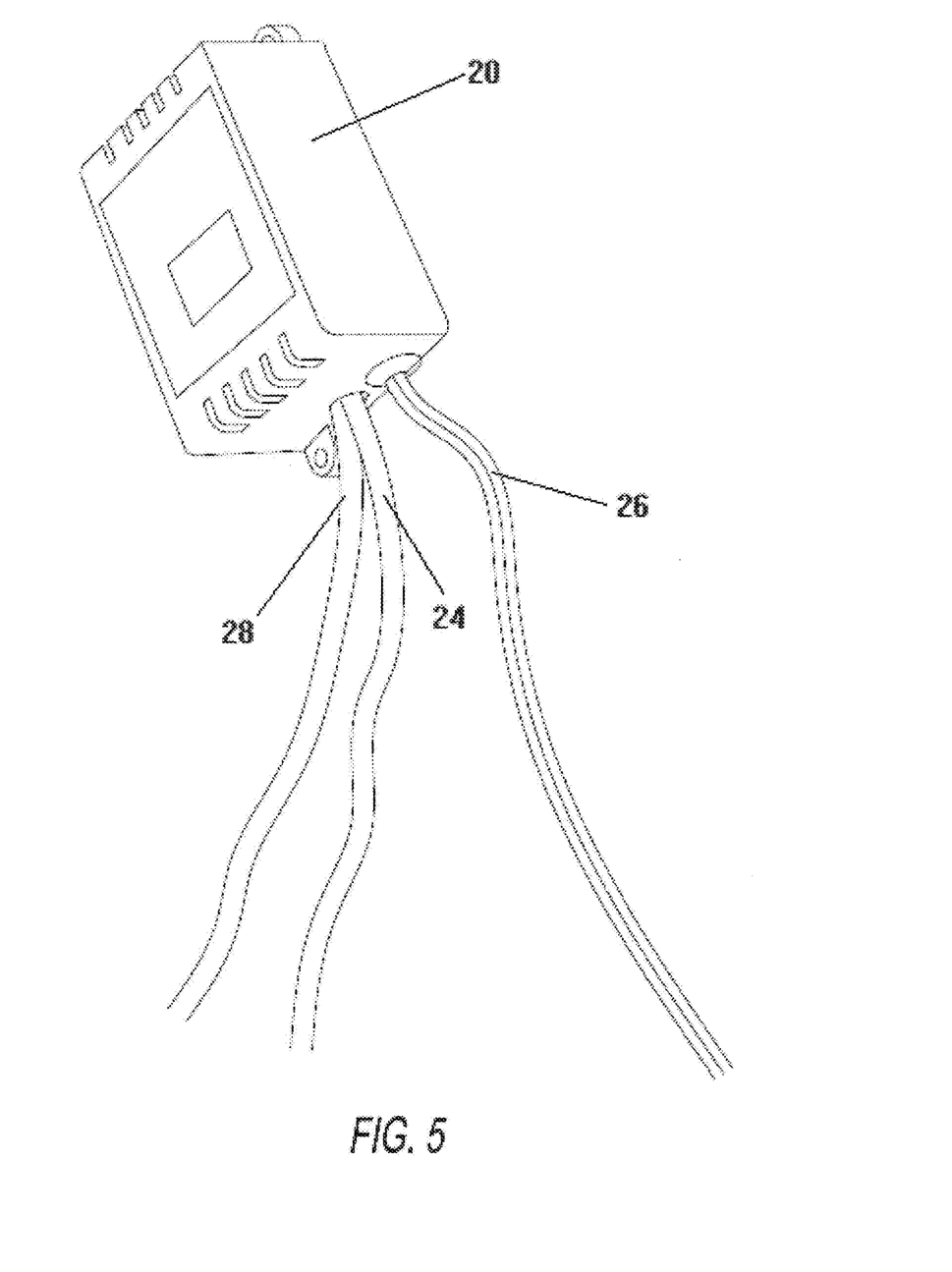
FIG. 5 shows an example of what the wireless receiving device and signal processing circuitry may look like depending on which wireless technology employed.

FIG. 5. shows a view of the receiving device and signal processing circuitry 20. The receiving device and signal processing circuitry 20 is mounted in a secure place in a vehicle. Signal receiving wire 26 should be placed in a place where a good signal can be received. Wire harness to receiving device and signal processing circuitry 28 should be connected to each wire harness 10 connected to headlight enclosure 2. Harness wire for positive and negative power 24 should be attached to a positive and negative of the vehicle's power source. Glass lens 4 is attached to the front of headlight enclosure 2.

Figure 6:
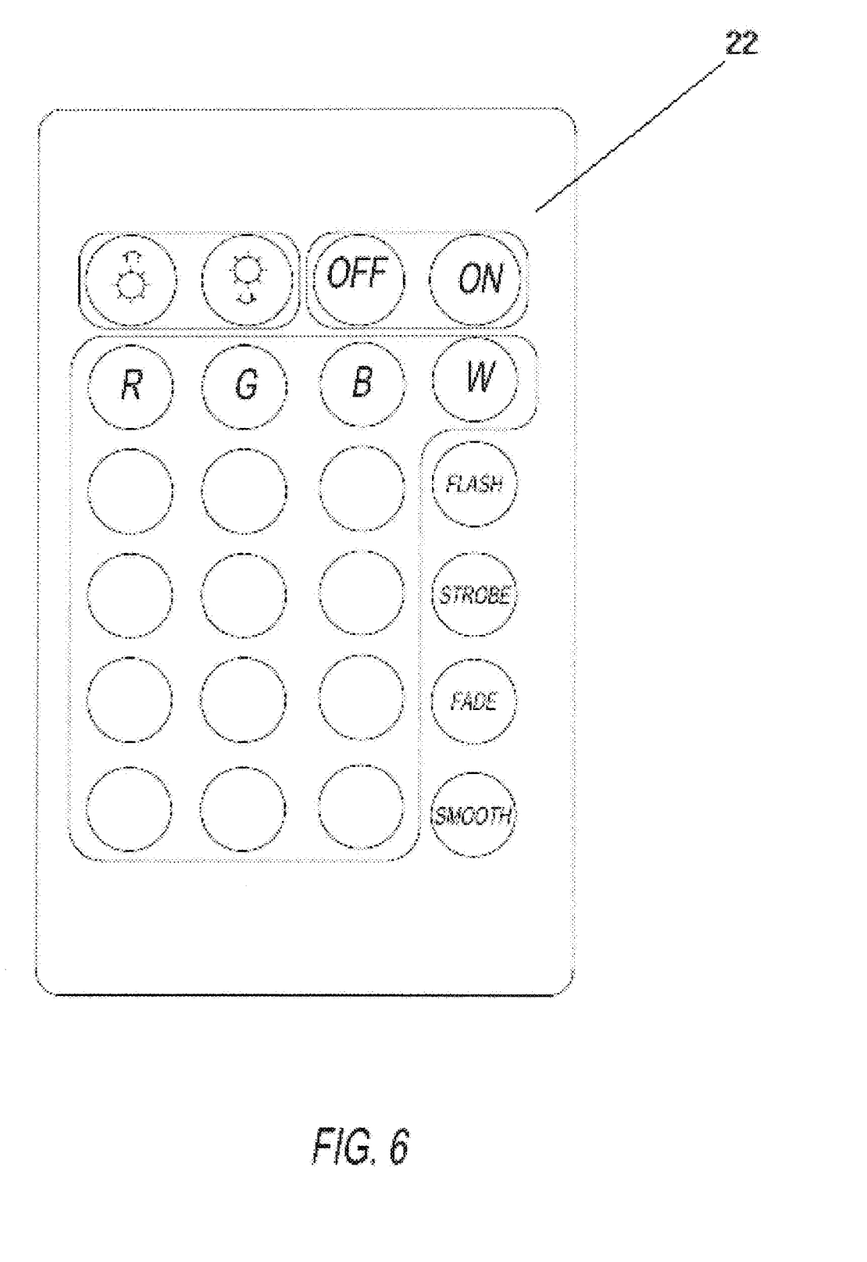
FIG. 6 shows an example of what the wireless transmitting device may look like depending on the wireless technology employed.

FIG. 6. shows a view of the wireless transmitting device 22 to wireless send signals to the wireless receiving device and signal processing circuitry 20. The wireless transmitting device 22 allows the user to select by touching a button; to turn on all of the LED, to turn off all of the LED, color intensity, a color shade and or a mode selection to specify an alternating color pattern.

Figure 7:
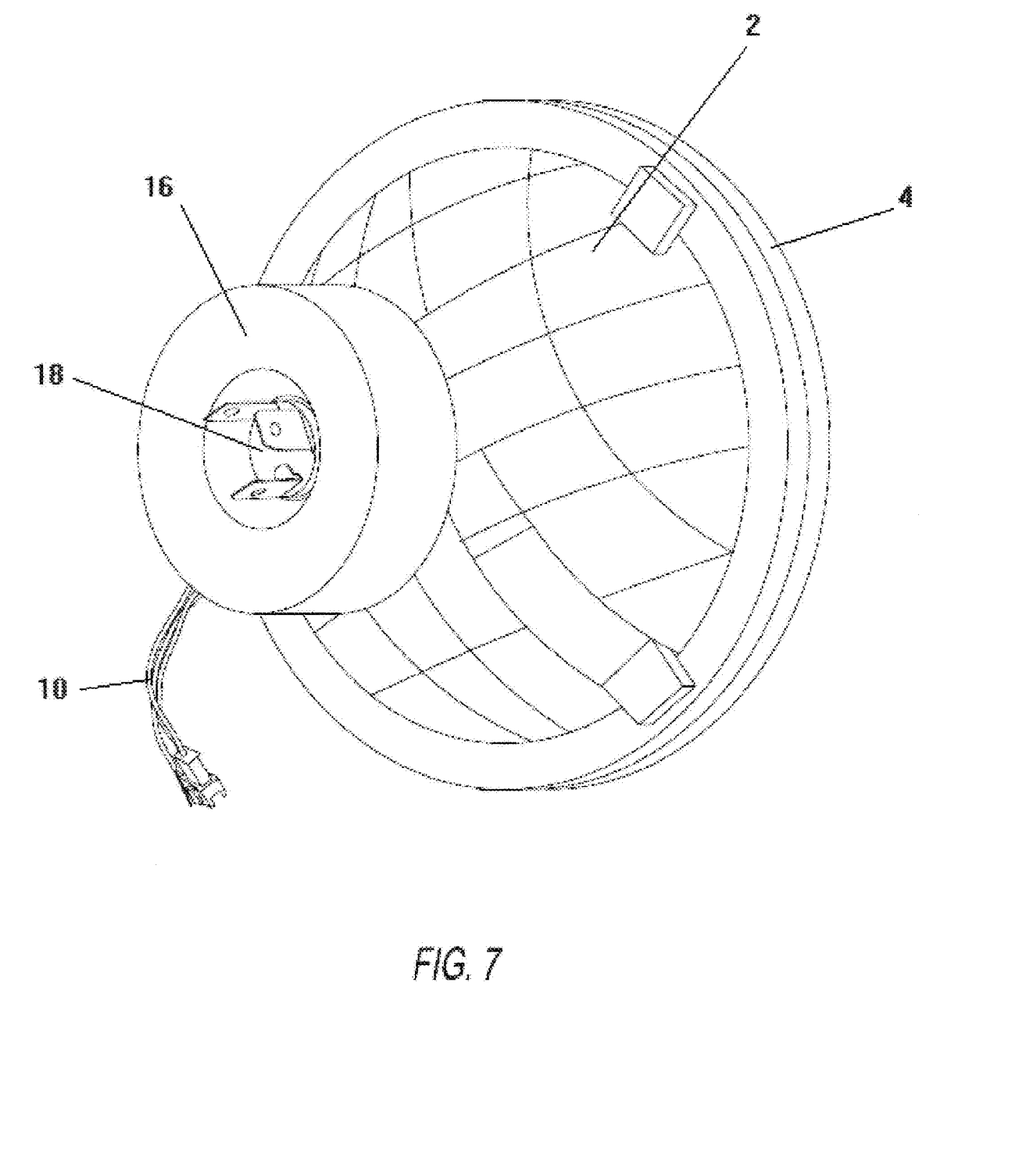
FIG. 7 shows an example of what the rear of the headlight with a pliable, rubber like boot to cover the lamp and lamp assembly area to seal and weather proof the headlight.

FIG. 7. shows a symmetrical rear view of head enclosure 2. The rear of headlight enclosure 2 contains a cylindrical base 34 containing the headlight retention assembly and the place to secure the center lamp shield 6 and main lighting device lamp 18. Pliable rubber boot 16 covers the cylindrical base 34 containing the headlight retention assembly with a weatherproof seal to keep moisture out of the headlight. Wire harness 10 is the wire harness that is connected to the PCB 8 on the inside of the headlight and passes through a grommet to the outside of the headlight. Wire harness 10 has a quick disconnect connector attached on the end.

The Single color or multiple color LED angel eyes halo headlight and its embodiments are made of plastic, steel, glass, rubber and PCB but different materials can also be used. Although the descriptions above contain many specification, these should not be construed as limiting the scope of the embodiments for example the headlight can he made In many different shapes and forms. The headlight enclosure and lens can be made into other shapes such as square, rectangle, oblong, oval, two piece or more, expandable, etc. The headlight enclosure and lens can be formed in many different types and forms. The PCB can conform to the same shape or form to fit the headlight enclosure. The parabolic reflective base 32 can be of many shapes and patterns or no pattern. FIG. 2 shows generally square shaped patterns 36 on the parabolic reflective base 32. The parabolic reflective base 32 having the square shaped patterns 36 reflects incident light corresponding to the square shaped patterns 36. The transmission and receiving device can be made of many different shapes, forms and materials. The Light Emitting Diodes (LED) includes the latest in present day LED technology can be made in many types, sizes, shapes, forms and materials, emitting radius, and levels of brightness and illumination. The lamp shield 6 can be made of many different, sizes, shapes, forms and materials. The rubber boot can be made in many pliable shapes, sizes forms and materials. Thus, the scope of the embodiments should be determined by the appended claims and their legal equivalence rather than by the examples given.

I claim:

1. A multiple-color LED angel eyes halo headlight system for a vehicle comprising:
    a headlight enclosure having a parabolic reflective base comprising a single patterned parabolic reflecting surface;
    an interchangeable main lighting device lamp located within the parabolic reflective base at a center of the headlight enclosure;
    a lamp shield located within the parabolic reflective base at the center of the headlight enclosure, said lamp shield attached to the headlight enclosure, and said lamp shield covering said main lighting device lamp located beneath the lamp shield;
    a plurality of multiple-color visible light emitting diodes (LEDs) symmetrically arranged on a printed circuit board (PCB) mounted around an inner circumferential wall of the headlight enclosure;
    a single clear glass lens interlocking with the headlight enclosure and encapsulating the parabolic reflective base, the main lighting device lamp, the lamp shield, and the LEDs;
    said lamp shield adapted to block light from the main lighting device lamp from being transmitted directly forward and out of the headlight enclosure, wherein said lamp shield reflects light from the main lighting device lamp as a focused light beam, backward to the single patterned parabolic reflecting surface, wherein said single patterned parabolic reflecting surface reflects said focused light beam reflected from the lamp shield and incident on said single patterned parabolic reflecting surface, forward and directly out of the headlight enclosure through said single clear glass lens; and
    said LEDs facing towards said single clear glass lens, said LEDs emitting light directly out of the headlight enclosure through said single clear glass lens without any reflection of said light from within the headlight enclosure, said LEDs remotely controlled by signals received from a wireless transmitting device by a wireless receiving device and signal processing circuitry positioned on said vehicle external to the headlight enclosure, wherein said wireless receiving device and signal processing circuitry transfers the received control signals to the LEDs to provide additional lighting and better side light when activated with the main lighting device, and wherein said LEDs operate as daylight running lights (DRL) when activated alone and the main lighting device lamp is switched off.

2. The vehicle headlight system of claim 1, wherein the PCB is located on the inside of the headlight enclosure immediately behind the single clear glass lens, and wherein the PCB comprises a plurality of wires that extend from a base of the PCB inside the headlight enclosure and exit outside the headlight enclosure to a LED signal harness connector.

3. The vehicle headlight system of claim 1, wherein the headlight enclosure comprises a main lighting device lamp receiving area on a backside of the headlight enclosure in the form of a cylindrical base containing a headlight retention assembly, wherein the headlight system further comprises a lamp retaining spring and a lamp retaining spring clip to tightly retain the main lighting device lamp, and wherein the headlight system further comprises a pliable boot to cover and encapsulate the headlight enclosure to provide weather proofing to the main lighting device lamp receiving area.

4. The vehicle headlight system of claim 1, wherein said wireless receiving device and signal processing circuitry transfers the control signals received remotely from the wireless transmitting device to the LEDs on the PCB, wherein the control signals are used to control color selection of the LEDs, color intensity of the LEDs, turn on all LEDs, turn off all LEDs, and select modes of color patterns based on a user's choice, and wherein the wireless receiving device is one of a Bluetooth based receiving device, an Internet Packet (IP) addressable receiving device, an Infrared based receiving device, and a Radio Frequency (RF) based receiving device.

5. The vehicle headlight system of claim 4, further comprising a wire harness for transferring the control signals from the wireless receiving device and signal processing circuitry to the LEDs, said wire harness terminating in a connector that mates with a LED signal harness connector coming out of the headlight enclosure.

6. The vehicle headlight system of claim 1, wherein the wireless transmitting device is one of a smart phone device with a user interface application, a Bluetooth based transmitting device, an Internet Packet (IP) addressable device, an Infrared based transmitting device, and a Radio Frequency (RF) based transmitting device.

7. A single-color LED angel eyes halo headlight system for a vehicle comprising:

a headlight enclosure having a parabolic reflective base comprising a single patterned parabolic reflecting surface;

an interchangeable main lighting device lamp located within the parabolic reflective base at a center of the headlight enclosure;

a lamp shield located within the parabolic reflective base at the center of the headlight enclosure, said lamp shield attached to the headlight enclosure, and said lamp shield covering said main lighting device lamp located beneath the lamp shield;

a plurality of single-color visible light emitting diodes (LEDs) symmetrically arranged on a printed circuit board (PCB) mounted around an inner circumferential wall of the headlight enclosure;

a single clear glass lens interlocking with the headlight enclosure and encapsulating the parabolic reflective base, the main lighting device lamp, the lamp shield, and the LEDs;

said lamp shield adapted to block light from the main lighting device lamp from being transmitted directly forward and out of the headlight enclosure, wherein said lamp shield reflects light from the main lighting device lamp as a focused light beam, backward to the single patterned parabolic reflecting surface, wherein said single patterned parabolic reflecting surface reflects said focused light beam reflected from the lamp shield and incident on said single patterned parabolic reflecting surface, forward and directly out of the headlight enclosure through said single clear glass lens; and said LEDs facing towards said single clear glass lens, said LEDs powered from a main power circuitry of the vehicle, said LEDs emitting light directly out of the headlight enclosure through said single clear glass lens without any reflection of said light from within the headlight enclosure, wherein said LEDs provide additional lighting and better side light when activated with the main lighting device lamp, and wherein said LEDs operate as daylight running lights (DRL) when activated alone and the main lighting device lamp is switched off.

8. An LED angel eyes halo headlight system for a vehicle comprising:

a headlight enclosure having a parabolic reflective base comprising a single patterned parabolic reflecting surface;

a first light source comprising an interchangeable main lighting device lamp, located within said parabolic reflective base at a center of said headlight enclosure;

a second light source comprising a ring of light emitting diodes (LEDs) mounted on a PCB attached to an inner circumferential wall of said headlight enclosure;

a lamp shield adapted to block light from said first light source from being transmitted directly forward and out of the headlight enclosure;

a single clear glass lens interlocking with said headlight enclosure and encapsulating said parabolic reflective base, said first light source, said lamp shield, and said second light source;

said lamp shield further adapted to reflect light from said first light source backward to said single patterned parabolic reflecting surface as a focused light beam;

said single patterned parabolic reflecting surface adapted to reflect said focused light beam reflected from said lamp shield and incident on said single patterned parabolic reflecting surface, forward and directly out of said headlight enclosure through said single clear glass lens; and said second light source emitting light directly out of the headlight enclosure through said single clear glass lens without any reflection from within said headlight enclosure, wherein said light emitted by said second light source provides additional lighting and better side light when activated with said first lighting source.

* * * * *